(12) United States Patent
Pita Gil et al.

(10) Patent No.: US 11,964,610 B2
(45) Date of Patent: Apr. 23, 2024

(54) CHANGING HEADLIGHT PROPERTIES TO RECOMMEND VEHICLE SPEED

(71) Applicant: TOYOTA RESEARCH INSTITUTE, INC., Los Altos, CA (US)

(72) Inventors: Guillermo Pita Gil, Redwood City, CA (US); Jaime S. Camhi, Los Gatos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 73 days.

(21) Appl. No.: 17/723,988

(22) Filed: Apr. 19, 2022

(65) Prior Publication Data

US 2023/0331146 A1 Oct. 19, 2023

(51) Int. Cl.

| B60Q 1/54 | (2006.01) |
|---|---|
| B60Q 1/14 | (2006.01) |
| F21S 41/65 | (2018.01) |
| F21Y 115/10 | (2016.01) |

(52) U.S. Cl.
CPC ............. B60Q 1/54 (2013.01); B60Q 1/1423 (2013.01); F21S 41/65 (2018.01); B60Q 2300/112 (2013.01); F21Y 2115/10 (2016.08)

(58) Field of Classification Search
CPC .......... B60Q 1/54; B60Q 1/1423; F21S 41/65
See application file for complete search history.

(56) References Cited

U.S. PATENT DOCUMENTS

| 4,272,800 A | * | 6/1981 | Asatourian | ............... | B60Q 1/54 |
| | | | | | 362/489 |
| 5,982,288 A | * | 11/1999 | Sawatari | .......... | G08G 1/096758 |
| | | | | | 340/602 |
| 6,037,861 A | * | 3/2000 | Ying | ......................... | B60Q 1/54 |
| | | | | | 340/461 |
| 6,037,862 A | * | 3/2000 | Ying | ...................... | B60K 31/18 |
| | | | | | 340/461 |
| 2003/0006897 A1 | * | 1/2003 | Chapin | .................... | B60Q 1/54 |
| | | | | | 340/425.5 |
| 2004/0105264 A1 | * | 6/2004 | Spero | .................. | F21V 23/0471 |
| | | | | | 362/276 |
| 2005/0157509 A1 | * | 7/2005 | Tsukamoto | .......... | B60Q 1/1423 |
| | | | | | 362/465 |

(Continued)

FOREIGN PATENT DOCUMENTS

| CN | 206690995 | 12/2017 |
| DE | 102004003534 | 8/2005 |

(Continued)

OTHER PUBLICATIONS

Garlitos, "It's Called the BladeScan Adaptive LED Headlights," Top Speed, Jun. 21, 2019, 6 pages (https://www.topspeed.com/cars/car-news/lexus-new-headlamp-technology-can-identify-people-from-almost-200-feet-away-at-night-ar185812.html).

*Primary Examiner* — Bryon T Gyllstrom
(74) *Attorney, Agent, or Firm* — SHEPPARD, MULLIN, RICHTER & HAMPTON LLP; Hector A. Agdeppa; Daniel N. Yannuzzi

(57) ABSTRACT

Systems and methods are provided for adjusting headlight properties according to the speed of the vehicle. In particular, some embodiments aim to optimize a vehicle's lighting in suboptimal conditions. Using the data processed by the ADAS, the system is able to optimize the vehicle's lighting by taking into account various factors beyond the current speed limit on the road.

31 Claims, 7 Drawing Sheets

(56) References Cited

U.S. PATENT DOCUMENTS

| | | | |
|---|---|---|---|
| 2008/0055065 A1* | 3/2008 | Feldmeier | B60Q 1/1423 340/458 |
| 2008/0055896 A1* | 3/2008 | Feldmeier | F21V 23/0457 362/276 |
| 2008/0062706 A1* | 3/2008 | Feldmeier | F21S 41/14 340/468 |
| 2019/0310633 A1* | 10/2019 | Toyoda | B60Q 5/005 |
| 2019/0318490 A1 | 10/2019 | Andelic | |
| 2021/0291723 A1* | 9/2021 | Kusumoto | H05B 47/105 |
| 2021/0331618 A1 | 10/2021 | Obata | |

FOREIGN PATENT DOCUMENTS

| | | |
|---|---|---|
| EP | 3028009 | 6/2016 |
| EP | 3138731 | 3/2017 |
| KR | 19980029837 | 7/1998 |
| WO | 2020035713 A1 | 2/2020 |

* cited by examiner

CHANGING HEADLIGHT PROPERTIES TO RECOMMEND VEHICLE SPEED

TECHNICAL FIELD

The present disclosure relates generally to autonomous driving, and in particular, some implementations may relate to driving systems that optimize headlight properties based on various factors and speed limitations.

DESCRIPTION OF RELATED ART

Advanced driver-assistance systems (ADAS) can refer to electronic systems that assist a vehicle operator while driving, parking, or otherwise maneuvering a vehicle. ADAS can increase vehicle and road safety by minimizing human error, and introducing some level of automated vehicle/vehicle feature control. Fully autonomous driving systems may go further than ADAS by leaving responsibility of maneuvering and controlling a vehicle to the autonomous driving systems. For example, an autonomous driving system may comprise some package or combination of sensors to perceive a vehicle's surroundings, advanced control systems that interpret the sensory information to identify appropriate navigation paths, obstacles, road signage, etc., and control the vehicle to effectuate movement in accordance with the appropriate navigation paths.

BRIEF SUMMARY OF THE DISCLOSURE

According to various embodiments of the disclosed technology, a vehicle may comprise a lighting matrix, a processor, and a memory encoded with instructions that when executed, cause the processor to: determining the vehicle's route and current speed; associate a lighting setting with the vehicle's route and current speed; determine a suggested speed associated with the vehicle's route based on one or more environmental factors; determine a suggested lighting setting associated with the suggested speed; compare the suggested lighting setting with the lighting setting associated with the vehicle's route and current speed; create a combined lighting setting; and adjust the lighting matrix based on the determined speed to the combined lighting setting.

In some embodiments, the lighting matrix comprises a LED lighting matrix.

In some embodiments, the one or more environmental factors comprise at least one of speed limit, visibility, weather conditions, operator state, and traffic.

In some embodiments, weather conditions is weighted more than the other factors for determining a suggested speed.

In some embodiments, the suggested speed is limited to the speed limit

In some embodiments, the suggested speed is determined by reducing the speed limit according to a weight associated with each of the one or more environmental factors.

In some embodiments, operator state is determined with the use of an internal camera facing a driver of the vehicle.

In some embodiments, operator state is determined with an advanced driving assistance system (ADAS).

In some embodiments, the environmental factors are determined based on the application of cloud data in real-time.

In some embodiments, the memory is encoded with instructions that when executed, further cause the processor to: determine the current speed of the vehicle; determine a lighting setting associated with the current speed; and adjust the lighting matrix to distinguish lighting associated with the suggested speed from lighting associated with the current speed.

In some embodiments, adjusting the lighting matrix to distinguish lighting associated with the suggested speed from lighting associated with the current speed involves setting lighting associated with the suggested speed as a first color and setting lighting associated with the current speed as a second color.

In some embodiments, adjusting the lighting matrix to distinguish lighting associated with the suggested speed from lighting associated with the current speed involves setting a gradient of lighting colors between the lighting associated with the suggested speed and lighting associated with the current speed.

In some embodiments, the lighting matrix automatically readjusts when the vehicle either increases or decreases speed.

In some embodiments, the lighting matrix automatically readjusts when the vehicle approaches a deviation in the vehicle's route.

In another embodiment, a method for projecting lighting from a vehicle comprises: determining the vehicle's route and current speed; determining a suggested speed associated with the vehicle's route based on one or more environmental factors; determining a suggested lighting setting associated with the suggested speed; and adjusting the lighting matrix based on the suggested speed to the suggested lighting setting.

In some embodiments, the one or more environmental factors comprise at least one of speed limit, visibility, weather conditions, operator state, and traffic.

In some embodiments, the suggested speed is determined by reducing the speed limit according to a weight associated with each of the one or more environmental factors.

In some embodiments, creating a combined lighting setting involves setting lighting associated with the suggested speed as a first color and setting lighting associated with the current speed as a second color.

In some embodiments, creating a combined lighting setting involves setting a gradient of lighting colors between the lighting associated with the suggested speed and lighting associated with the current speed.

In some embodiments, the lighting matrix automatically readjusts when the vehicle either increases or decreases speed.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
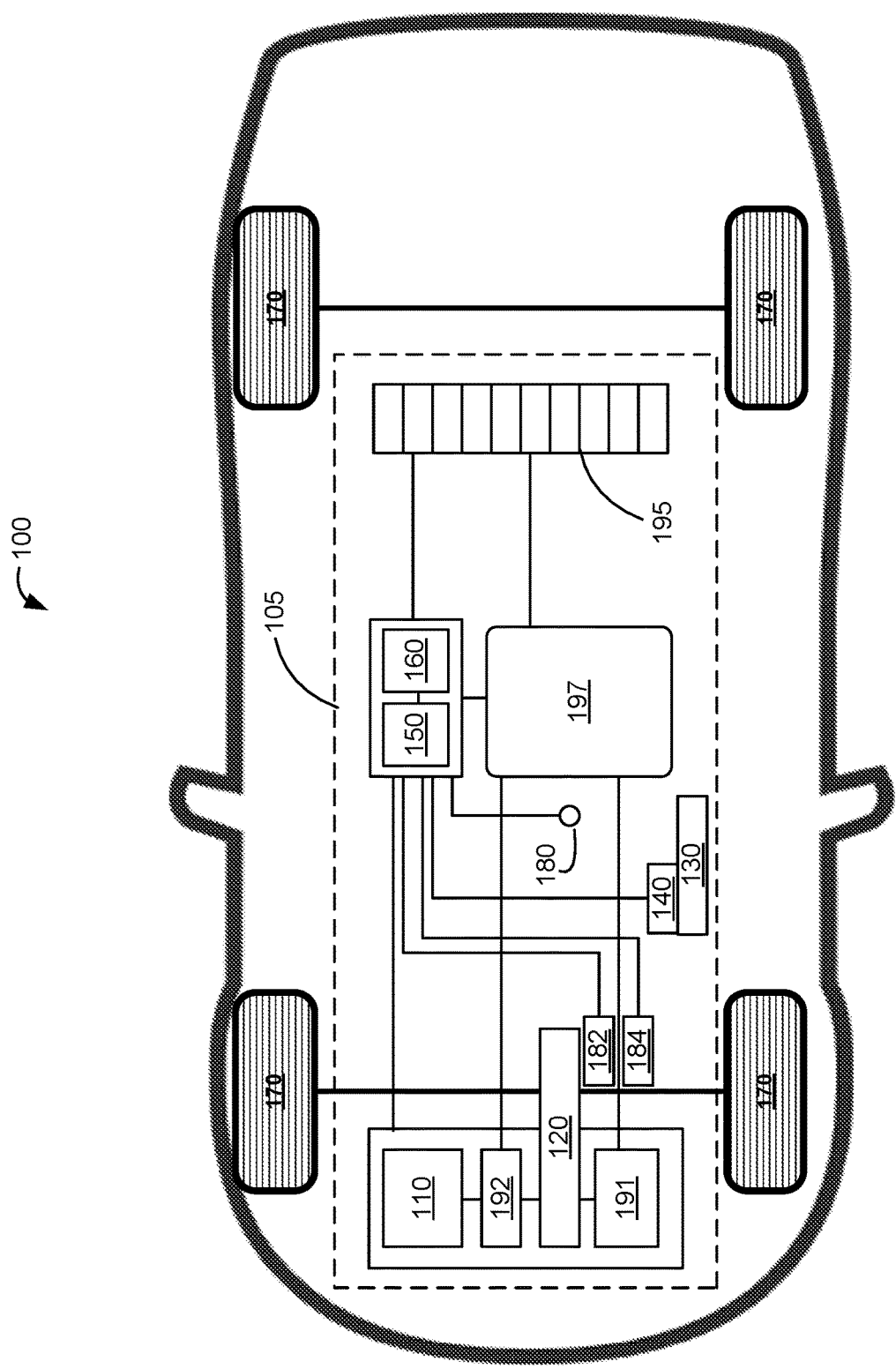
FIG. 1 is a schematic representation of an example vehicle with which embodiments of the systems and methods disclosed herein may be implemented.

The figures are not exhaustive and do not limit the present disclosure to the precise form disclosed.

DETAILED DESCRIPTION

ADAS and autonomous driving control systems can be used in vehicles that at least, in part, control or manage vehicle operation to provide varying levels of automated control or assistance, and may or may not actually influence/affect driving dynamics. For ease of reference, the term "autonomous control" will be used herein to refer to such systems. In some vehicles, an override mechanism, such as an override switch, may be used to turn off or disengage a vehicle's autonomous control system. Such an override mechanism can allow a driver/operator or passenger to assume manual control of a vehicle. When invoking conventional implementations of override mechanisms in a safety scenario (e.g., to avoid a collision), a vehicle operator engages in a human/manual situational assessment, and may intervene/override autonomous control by manually actuating a driving control mechanism, such as grasping and controlling a steering wheel, actuating a brake pedal, actuating a throttle pedal, and so on. In some vehicles, ADAS provide warning alerts or notifications to a driver, where these alerts/notifications are intended to invoke some reaction or response from the driver to, e.g., correct a current driving behavior.

It should be understood that the current (and a least a portion of a future) state of vehicular autonomous control may fall under what can be referred to as a transition period prior to the realization of fully autonomous driving. Thus, a human operator, i.e., a driver of a vehicle, may still inject some amount of control and/or may be prompted to take certain action(s), e.g., in response to some road or vehicle operating condition as alluded to above. In particular, such influential control may act as an intuitive reinforcement of some action(s) being promulgated by a vehicle ADAS, e.g., so that the driver of the vehicle may understand and appreciate the autonomous control being effectuated over the vehicle. In some embodiments, such influential control, alternatively, or in addition to the aforementioned reinforcement, may act to induce or prompt the driver to impart some complementary action(s) to existing ADAS-initiated control of the vehicle, or even in response to current driver-initiated control of the vehicle. In the event the driver's current action(s) do not comport with ADAS-effectuated control (or if the driver's current action(s) should be enhanced or augmented with additional action(s)/greater level of action(s)), such influential control can make the driver aware that his/her action(s) differ from the ADAS-effectuated control and/or intervene to induce or prompt the driver to stop his/her non-conforming action(s)/behavior(s).

In some current ADASs, a torque may be applied, by/under the control of the ADAS system, to the steering wheel so that actual steering can be influenced. That is, in some scenarios, the actual driving dynamics of a vehicle can be affected by this ADAS feature.

Embodiments of the present system can operate with or without the influence of ADAS. In particular, some embodiments can adjust headlight properties according to the speed of the vehicle. In particular, some embodiments aim to optimize a vehicle's lighting in suboptimal conditions. Suboptimal conditions can be determined based on a variety of data received by the vehicle, either through the ADAS or through the navigation system, wherein traffic and weather data may be incorporated. These suboptimal conditions can include weather events, traffic conditions, a driver's state of operation, or deviations in navigation. The system can weigh the above conditions as factors to determine how to adjust the lighting. A particular factor/condition can refer to an adjustment made to the headlights to accommodate the condition. Using the data processed by the ADAS, the system is able to optimize the vehicle's lighting by taking into account various factors beyond the current speed limit on the road. Furthermore, embodiments of the present system incentivize drivers to maintain a reasonable speed by providing increased lighting up to a maximum speed. Since a driver may not receive additional lighting beyond the maximum speed, the driver may reduce speed to maintain proper lighting. Alternatively, lighting may be provided in a different color to show the driver that the vehicle is exceeding a recommended speed. Different colors may arise from the same headlight system via a lighting matrix, where individual bulbs in the matrix can be adjusted to one or more colors according to the situation. The brightness can also be altered for these bulbs such that the lighting extends to a farther distance. Individual lights can have different brightness values to give the appearance of a color and/or brightness as a certain distance from the vehicle and a separate color and/or brightness at a further distance from the vehicle. This can be especially helpful in allowing a driver to focus more on the road than the dashboard. The driver would effectively be able to see that speed is exceeded without looking at the actual speed of the vehicle.

The systems and methods disclosed herein may be implemented with or by any of a number of different vehicles and vehicle types, and may operate with or without assistance from an ADAS. For example, the systems and methods disclosed herein may be used with automobiles, trucks, motorcycles, recreational vehicles and other like on- or off-road vehicles. In addition, the principles disclosed herein may also extend to other vehicle types as well. An example hybrid electric vehicle is illustrated and described below as one example.

FIG. 1 illustrates an example hybrid electric vehicle (HEV) 100 in which various embodiments for driver disengagement of autonomous vehicle/driving controls may be implemented. It should be understood that various embodiments disclosed herein may be applicable to/used in various vehicles (internal combustion engine (ICE) vehicles, fully electric vehicles (EVs), etc.) that are fully or partially autonomously controlled/operated, not only HEVs.

HEV 100 can include drive force unit 105 and wheels 170. Drive force unit 105 may include an engine 110, motor generators (MGs) 191 and 192, a battery 195, an inverter 197, a brake pedal 130, a brake pedal sensor 140, a transmission 120, a memory 160, an electronic control unit (ECU) 150, a shifter 180, a speed sensor 182, and an accelerometer 184.

Engine 110 primarily drives the wheels 170. Engine 110 can be an ICE that combusts fuel, such as gasoline, ethanol, diesel, biofuel, or other types of fuels which are suitable for combustion. The torque output by engine 110 is received by the transmission 120. MGs 191 and 192 can also output torque to the transmission 120. Engine 110 and MGs 191 and 192 may be coupled through a planetary gear (not shown in FIG. 1B). The transmission 120 delivers an applied torque to the wheels 170. The torque output by engine 110 does not directly translate into the applied torque to the wheels 170.

MGs 191 and 192 can serve as motors which output torque in a drive mode, and can serve as generators to recharge the battery 195 in a regeneration mode. The electric power delivered from or to MGs 191 and 192 passes through inverter 197 to battery 195. Brake pedal sensor 140 can detect pressure applied to brake pedal 130, which may further affect the applied torque to wheels 170. Speed sensor 182 is connected to an output shaft of transmission 120 to detect a speed input which is converted into a vehicle speed by ECU 150. Accelerometer 184 is connected to the body of HEV 100 to detect the actual deceleration of HEV 100, which corresponds to a deceleration torque.

Transmission 120 is a transmission suitable for an HEV. For example, transmission 120 can be an electronically controlled continuously variable transmission (ECVT), which is coupled to engine 110 as well as to MGs 191 and 192. Transmission 120 can deliver torque output from a combination of engine 110 and MGs 191 and 192. The ECU 150 controls the transmission 120, utilizing data stored in memory 160 to determine the applied torque delivered to the wheels 170. For example, ECU 150 may determine that at a certain vehicle speed, engine 110 should provide a fraction of the applied torque to the wheels while MG 191 provides most of the applied torque. ECU 150 and transmission 120 can control an engine speed (NE) of engine 110 independently of the vehicle speed (V).

ECU 150 may include circuitry to control the above aspects of vehicle operation. ECU 150 may include, for example, a microcomputer that includes one or more processing units (e.g., microprocessors), memory storage (e.g., RAM, ROM, etc.), and I/O devices. ECU 150 may execute instructions stored in memory to control one or more electrical systems or subsystems in the vehicle. ECU 150 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., anti-lock braking system (ABS) or electronic stability control (ESC)), battery management systems, and so on. These various control units can be implemented using two or more separate electronic control units, or using a single electronic control unit.

MGs 191 and 192 each may be a permanent magnet type synchronous motor including for example, a rotor with a permanent magnet embedded therein. MGs 191 and 192 may each be driven by an inverter controlled by a control signal from ECU 150 so as to convert direct current (DC) power from battery 195 to alternating current (AC) power, and supply the AC power to MGs 191, 192. MG 192 may be driven by electric power generated by motor generator MG 191. It should be understood that in embodiments where MGs 191, 192 are DC motors, no inverter is required. The inverter, in conjunction with a converter assembly may also accept power from one or more of MGs 191, 192 (e.g., during engine charging), convert this power from AC back to DC, and use this power to charge battery 195 (hence the name, motor generator). ECU 150 may control the inverter, adjust driving current supplied to MG 192, and adjust the current received from MG 191 during regenerative coasting and braking.

Battery 195 may be implemented as one or more batteries or other power storage devices including, for example, lead-acid batteries, lithium ion, and nickel batteries, capacitive storage devices, and so on. Battery 195 may also be charged by one or more of MGs 191, 192, such as, for example, by regenerative braking or by coasting during which one or more of MGs 191, 192 operates as generator. Alternatively (or additionally, battery 195 can be charged by MG 191, for example, when HEV 100 is in idle (not moving/not in drive). Further still, battery 195 may be charged by a battery charger (not shown) that receives energy from engine 110. The battery charger may be switched or otherwise controlled to engage/disengage it with battery 195. For example, an alternator or generator may be coupled directly or indirectly to a drive shaft of engine 110 to generate an electrical current as a result of the operation of engine 110. Still other embodiments contemplate the use of one or more additional motor generators to power the rear wheels of a vehicle (e.g., in vehicles equipped with 4-Wheel Drive), or using two rear motor generators, each powering a rear wheel.

Battery 195 may also be used to power other electrical or electronic systems in the vehicle. Battery 195 can include, for example, one or more batteries, capacitive storage units, or other storage reservoirs suitable for storing electrical energy that can be used to power MG 191 and/or MG 192. When battery 195 is implemented using one or more batteries, the batteries can include, for example, nickel metal hydride batteries, lithium ion batteries, lead acid batteries, nickel cadmium batteries, lithium ion polymer batteries, and other types of batteries.

Figure 2A:
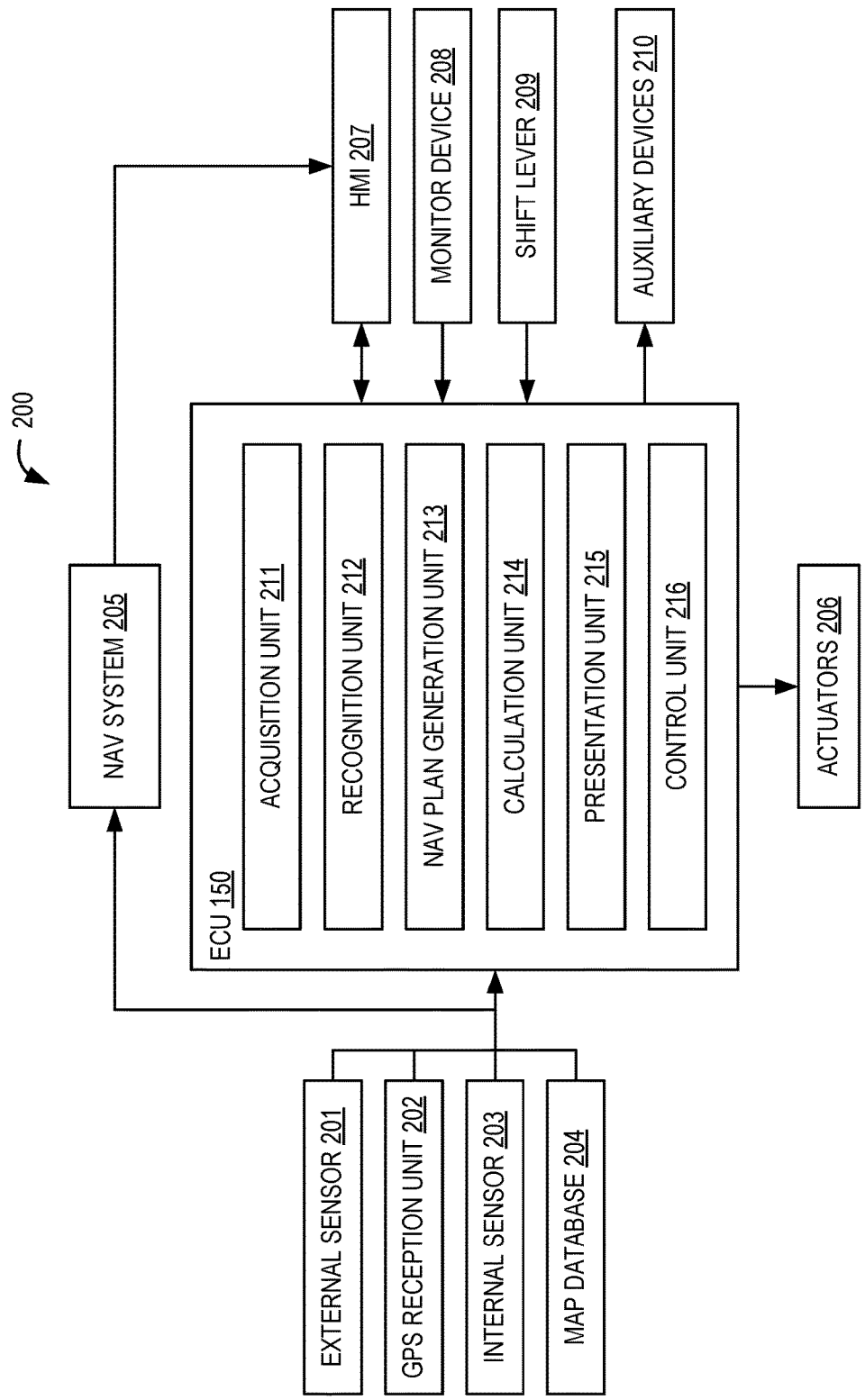
FIG. 2A illustrates an example autonomous control system.

FIG. 2A illustrates an example autonomous control system 200 that may be used to autonomously control a vehicle, e.g., HEV 100. Autonomous control system 200 may be installed in HEV 100, and executes autonomous control of HEV 100. As described herein, autonomous control can refer to control that executes driving/assistive driving operations such as acceleration, deceleration, and/or steering of a vehicle, general movement of the vehicle, without necessarily depending or relying on driving operations/directions by a driver or operator of the vehicle.

As an example, autonomous control may include lane keeping assist control where a steering wheel (not shown) is steered automatically (namely, without depending on a steering operation by the driver) such that HEV 100 does not depart from a running lane. That is, the steering wheel is automatically operated/controlled such that HEV 100 runs along the running lane, even when the driver does not perform any steering operation. As alluded to above, other autonomous control may include assistive driving mechanisms in the form of, e.g., visual or audible alerts or warnings, indirect haptic feedback, such as vibrating the driver's seat, etc.

As another example, autonomous control may include navigation control, where when there is no preceding vehicle in front of the HEV 100, constant speed (cruise) control is effectuated to make HEV 100 run at a determined constant speed. When there is a preceding vehicle in front of HEV 100, follow-up control is effectuated to adjust HEV 100's speed according to a distance between HEV 100 and the preceding vehicle.

In some scenarios, switching from autonomous control to manual driving may be executed. Whether or not to execute this switch from autonomous control to manual driving may be determined based on a comparison between a comparison target and a threshold. In one embodiment, the comparison target is quantified so as to be compared with the threshold. When the comparison target is equal to or more than the threshold, the autonomous control system 200 executes the switch from an autonomous control mode to a manual driving mode. In other situations/scenarios, autonomous control system 200 may take over operation, effecting a switch from manual driving/control to autonomous control. As will be discussed in greater detail below, autonomous control system 200 may make certain determinations regarding whether to comply or proceed with autonomous control based on a command from autonomous control system 200. For example, considerations regarding recoverability and vehicle control under certain conditions may be considered as factors in determining whether or not autonomous control can be safely executed. Such considerations may also be reflected as thresholds for comparison.

For example, when an operation amount of any of a steering operation, an acceleration operation, and brake operation by the driver of HEV 100 during the autonomous driving control becomes equal to or more than a threshold, autonomous control system 200 may execute a switch from autonomous control to manual control.

It should be understood that manual control or manual driving can refer to a vehicle operating status wherein a vehicle's operation is based mainly on driver-controlled operations/maneuvers. In an ADAS context, driving operation support control can be performed during manual driving. For example, a driver may be actively performing any of a steering operation, an acceleration operation, and a brake operation of the vehicle, while autonomous control apparatus 200 performs some subset of one or more of those operations, e.g., in an assistive, complementary, or corrective manner. As another example, driving operation support control adds or subtracts an operation amount to or from the operation amount of the manual driving (steering, acceleration, or deceleration) that is performed by the driver. It should be understood that in such scenarios, use of influential control over a driver's steering hand(s), because a driver is already engaging in a "proper" operation, may enforce or positively reinforce the driver's action(s).

In the example shown in FIG. 2A, autonomous control system 200, external sensor 201, a GPS (Global Positioning System) reception unit 202, an internal sensor 203, a map database 204, a navigation system 205, actuators 206, an HMI (Human Machine Interface) 207, a monitor device 208, a shift lever 209, and auxiliary devices 210 are provided. Autonomous control system 200 may communicate with ECU 150, or in some embodiments may be implemented with its own ECU.

External sensor 201 is a detector that detects external circumstances such as surrounding information of HEV 100. The external sensor 201 may include at least one of a camera, a radar, and a Laser Imaging Detection and Ranging (LIDAR) unit.

The camera unit may be an imaging device that images the external circumstances surrounding the vehicle. For example, the camera is provided on a back side of a front windshield of the vehicle. The camera may be a monocular camera or a stereo camera. The camera outputs, to the ECU 150, image information on the external circumstances surrounding the vehicle. The camera is not limited to a visible light wavelength camera but can be an infrared camera.

The radar unit uses radio waves to detect obstacles outside of the vehicle by transmitting radio waves to the surroundings of the vehicle, and receiving reflected radio waves from an obstacle to detect the obstacle, distance to the obstacle or a relative positional direction of the obstacle. The radar unit outputs detected obstacle information to the ECU 150.

The LIDAR unit may operate similar to the manner in which the radar unit operates except that light is used in place of radio waves. The LIDAR unit outputs detected obstacle information to the ECU 150.

GPS reception unit 202 receives signals from three or more GPS satellites to obtain position information indicating a position of HEV 100. For example, the position information can include latitude information and longitude information. The GPS reception unit 202 outputs the measured position information of the vehicle to the ECU 150.

Internal sensor 203 is a detector for detecting information regarding, e.g., a running status of HEV 100, operational/operating conditions, e.g., amount of steering wheel actuation, rotation, angle, amount of acceleration, accelerator pedal depression, brake operation by the driver of HEV 100. The internal sensor 203 includes at least one of a vehicle speed sensor, an acceleration sensor, and a yaw rate sensor. Moreover, internal sensor 203 may include at least one of a steering sensor, an accelerator pedal sensor, and a brake pedal sensor.

A vehicle speed sensor is a detector that detects a speed of the HEV 100. In some embodiments, HEV 100's speed may be measured directly or through calculations/inference depending on the operating conditions/status of one or more other components of HEV 100. For example, a wheel speed sensor can be used as the vehicle speed sensor to detect a rotational speed of the wheel, which can be outputted to ECU 150.

The acceleration sensor can be a detector that detects an acceleration of the vehicle. For example, the acceleration sensor may include a longitudinal acceleration sensor for detecting a longitudinal acceleration of HEV 100, and a lateral acceleration sensor for detecting a lateral acceleration of HEV 100. The acceleration sensor outputs, to the ECU 150, acceleration information.

The yaw rate sensor can be a detector that detects a yaw rate (rotation angular velocity) around a vertical axis passing through the center of gravity of HEV 100. For example, a gyroscopic sensor is used as the yaw rate sensor. The yaw rate sensor outputs, to the ECU 150, yaw rate information including the yaw rate of HEV 100.

The steering sensor may be a detector that detects an amount of a steering operation/actuation with respect to a steering wheel 30 by the driver of HEV 100. The steering operation amount detected by the steering sensor may be a steering angle of the steering wheel or a steering torque applied to the steering wheel, for example. The steering sensor outputs, to the ECU 150, information including the steering angle of the steering wheel or the steering torque applied to the steering wheel of HEV 100.

The accelerator pedal sensor may be a detector that detects a stroke amount of an accelerator pedal, for example, a pedal position of the accelerator pedal with respect to a reference position. The reference position may be a fixed position or a variable position depending on a determined parameter. The accelerator pedal sensor is provided to a shaft portion of the accelerator pedal AP of the vehicle, for example. The accelerator pedal sensor outputs, to the ECU 150, operation information reflecting the stroke amount of the accelerator pedal.

The brake pedal sensor may be a detector that detects a stroke amount of a brake pedal, for example, a pedal position of the brake pedal with respect to a reference position. Like the accelerator position, a brake pedal reference position may be a fixed position or a variable position depending on a determined parameter. The brake pedal sensor may detect an operation force of the brake pedal (e.g. force on the brake pedal, oil pressure of a master cylinder, and so on). The brake pedal sensor outputs, to the ECU 150, operation information reflecting the stroke amount or the operation force of the brake pedal.

A map database 204 may be a database including map information. The map database 204 is implemented, for example, in a disk drive or other memory installed in HEV 100. The map information may include road position information, road shape information, intersection position information, and fork position information, for example. The road shape information may include information regarding a road type such as a curve and a straight line, and a curvature angle of the curve. When autonomous control system 200 uses a Simultaneous Localization and Mapping (SLAM) technology or position information of blocking structural objects such as buildings and walls, the map information may further include an output signal from external sensor 201. In some embodiments, map database 204 may be a remote data base or repository with which HEV 100 communicates.

Navigation system 205 may be a component or series of interoperating components that guides the driver of HEV 100 to a destination on a map designated by the driver of HEV 100. For example, navigation system 205 may calculate a route followed or to be followed by HEV 100, based on the position information of HEV 100 measured by GPS reception unit 202 and map information of map database 204. The route may indicate a running lane of a section(s) of roadway in which HEV 100 traverses, for example. Navigation system 205 calculates a target route from the current position of HEV 100 to the destination, and notifies the driver of the target route through a display, e.g., a display of a head unit, HMI 207 (described below), and/or via audio through a speaker(s) for example. The navigation system 205 outputs, to the ECU 150, information of the target route for HEV 100. In some embodiments, navigation system 205 may use information stored in a remote database, like map database 204, and/or some information processing center with which HEV 100 can communicate. A part of the processing executed by the navigation system 205 may be executed remotely as well.

Actuators 206 may be devices that execute running controls of HEV 100. The actuators 206 may include, for example, a throttle actuator, a brake actuator, and a steering actuator. For example, the throttle actuator controls, in accordance with a control signal output from the ECU 150, an amount by which to open the throttle of HEV 100 to control a driving force (the engine) of HEV 100. In another example, actuators 206 may include one or more of MGs 191 and 192, where a control signal is supplied from the ECU 150 to MGs 191 and/or 192 to output motive force/energy. The brake actuator controls, in accordance with a control signal output from the ECU 150, the amount of braking force to be applied to each wheel of the vehicle, for example, by a hydraulic brake system. The steering actuator controls, in accordance with a control signal output from the ECU 150, driving an assist motor of an electric power steering system that controls steering torque.

HMI 207 may be an interface used for communicating information between a passenger(s) (including the operator) of HEV 100 and autonomous control system 200. For example, the HMI 207 may include a display panel for displaying image information for the passenger(s), a speaker for outputting audio information, and actuation mechanisms, such as buttons or a touch panel used by the occupant for performing an input operation. HMI 207 may also or alternatively transmit the information to the passenger(s) through a mobile information terminal connected wirelessly and receive the input operation by the passenger(s) through the mobile information terminal.

Monitor device 208 monitors a status of the driver/operator. The monitor device 208 can check a manual driving preparation state of the driver. More specifically, the monitor device 208 can check, for example, whether or not the driver is ready to start manual operation of HEV 100. Moreover, the monitor device 208 can check, for example, whether or not the driver has some intention of switching HEV 100 to a manual mode of operation.

For example, the monitor device 208 may be a camera that can take an image of the driver, where the image can be used for estimating the degree to which the driver's eyes are open, the direction of the driver's gaze, whether or not the driver is holding the steering wheel, etc. Monitor device 208 may also be a pressure sensor for detecting the amount of pressure the driver's hand(s) are applying to the steering wheel. As another example, the monitor device 208 can be a camera that takes an image of a hand of the driver.

A shift lever 209 can be positioned at a shift position, e.g., "A (AUTOMATIC)," "D (DRIVE)," etc. The shift position "A" indicates, for example, an automatic engage mode where autonomous control is engaged automatically. The shift position "D" indicates a triggered engage mode where autonomous control is engaged in response to a driver-initiated request to operate HEV 100 in an autonomous driving mode.

Auxiliary devices 210 may include devices that can be operated by the driver of the vehicle, but are not necessarily drive-related, such as actuators 206. For example, auxiliary devices 210 may include a direction indicator, a headlight, a windshield wiper and the like.

ECU 150 may execute autonomous control of the vehicle, and may include an acquisition unit 211, a recognition unit 212, a navigation plan generation unit 213, a calculation unit 214, a presentation unit 215, and a control unit 216.

Acquisition unit 211 may obtain the following operation amounts or levels of actuation based on the information obtained by the internal sensor 203: steering operation, acceleration operation, and brake operation by the driver during an autonomous control mode; and the level of steering operation, acceleration operation, and brake operation by the driver of the vehicle during a manual control mode.

Recognition unit 212 may recognize or assess the environment surrounding or neighboring HEV 100 based on the information obtained by the external sensor 201, the GPS reception unit 202, and/or the map database 204. For example, the recognition unit 212 includes an obstacle recognition unit (not shown), a road width recognition unit (not shown), and a facility recognition unit (not shown). The obstacle recognition unit recognizes, based on the information obtained by the external sensor 201, obstacles surrounding the vehicle. For example, the obstacles recognized by the obstacle recognition unit include moving objects such as pedestrians, other vehicles, motorcycles, and bicycles and stationary objects such as a road lane boundary (white line, yellow line), a curb, a guard rail, poles, a median strip, buildings and trees. The obstacle recognition unit obtains information regarding a distance between the obstacle and the vehicle, a position of the obstacle, a direction, a relative velocity, a relative acceleration of the obstacle with respect to the vehicle, and a category and attribution of the obstacle. The category of the obstacle includes a pedestrian, another vehicle, a moving object, and a stationary object. The attribution of the obstacle can refer to a property of the obstacle such as hardness and a shape of the obstacle.

The road width recognition unit recognizes, based on the information obtained by the external sensor 201, the GPS reception unit 202, and/or the map database 204, a road width of a road in which the vehicle is running.

The facility recognition unit recognizes, based on the map information obtained from the map database 204 and/or the vehicle position information obtained by the GPS reception unit 202, whether or not HEV 100 is operating/being driven through an intersection, in a parking structure, etc. The facility recognition unit may recognize, based on the map information and the vehicle position information, whether or not the vehicle is running in a school zone, near a childcare facility, near a school, or near a park, etc.

Navigation plan generation unit 213 may generate a navigation plan for HEV 100 based on the target route calculated by the navigation system 205, the information on obstacles surrounding HEV 100 recognized by recognition unit 212, and/or the map information obtained from map database 204. The navigation plan may be reflect one or more operating conditions/controls to effectuate the target route. For example, the navigation plan can include a target speed, a target acceleration, a target deceleration, a target direction, and/or a target steering angle with which HEV 100 should be operated at any point(s) along the target route so that the target route can be achieved to reach a desired destination. It should be understood that navigation plan generation unit 213 generates the navigation plan such that HEV 100 operates along the target route while satisfying one or more criteria and/or constraints, including, for example, safety constraints, legal compliance rules, operating (fuel/energy) efficiency, and the like. Moreover, based on the existence of obstacles surrounding HEV 100, the navigation plan generation unit 213 generates the navigation plan for the vehicle so as to avoid contact with such obstacles.

Calculation unit 214 may calculate a threshold used for determining whether or not to switch from autonomous control to manual driving or vice versa. The determination can be performed based on the operating levels associated with the manner in which the driver is operating HEV 100 during autonomous control which is obtained by the acquisition unit 211. For example, the driver of HEV 100 may suddenly grasp the steering wheel (which can be sensed by internal sensor 203) and stomp on the brake pedal (which can be sensed by monitor device 208). The pressure on the steering wheel and the level of actuation of the brake pedal may be excessive enough (exceed a threshold) suggesting that the driver intends to override the autonomous control system 200.

Presentation unit 215 displays, on a display of the HMI 207, a threshold which is calculated by the calculation unit 214 and used for determining whether or not to execute the switching from autonomous control to the manual driving or vice versa.

Control unit 216 can autonomously control HEV 100 based on the navigation plan generated by navigation plan generation unit 213. The control unit 216 outputs, to the actuators 206, control signals according to the navigation plan. That is, the control unit 216 controls actuators 206 based on the navigation plan, and thereby autonomous control of HEV 100 is executed/achieved. Moreover, certain levels of operation, e.g., steering wheel actuation, by the driver can be detected by the acquisition unit 211. When such level(s) equal or exceed the threshold calculated by the calculation unit 214 in a period during which autonomous control is being used to operate HEV 100, control unit 216 executes a switching from autonomous control to manual control.

Figure 2B:
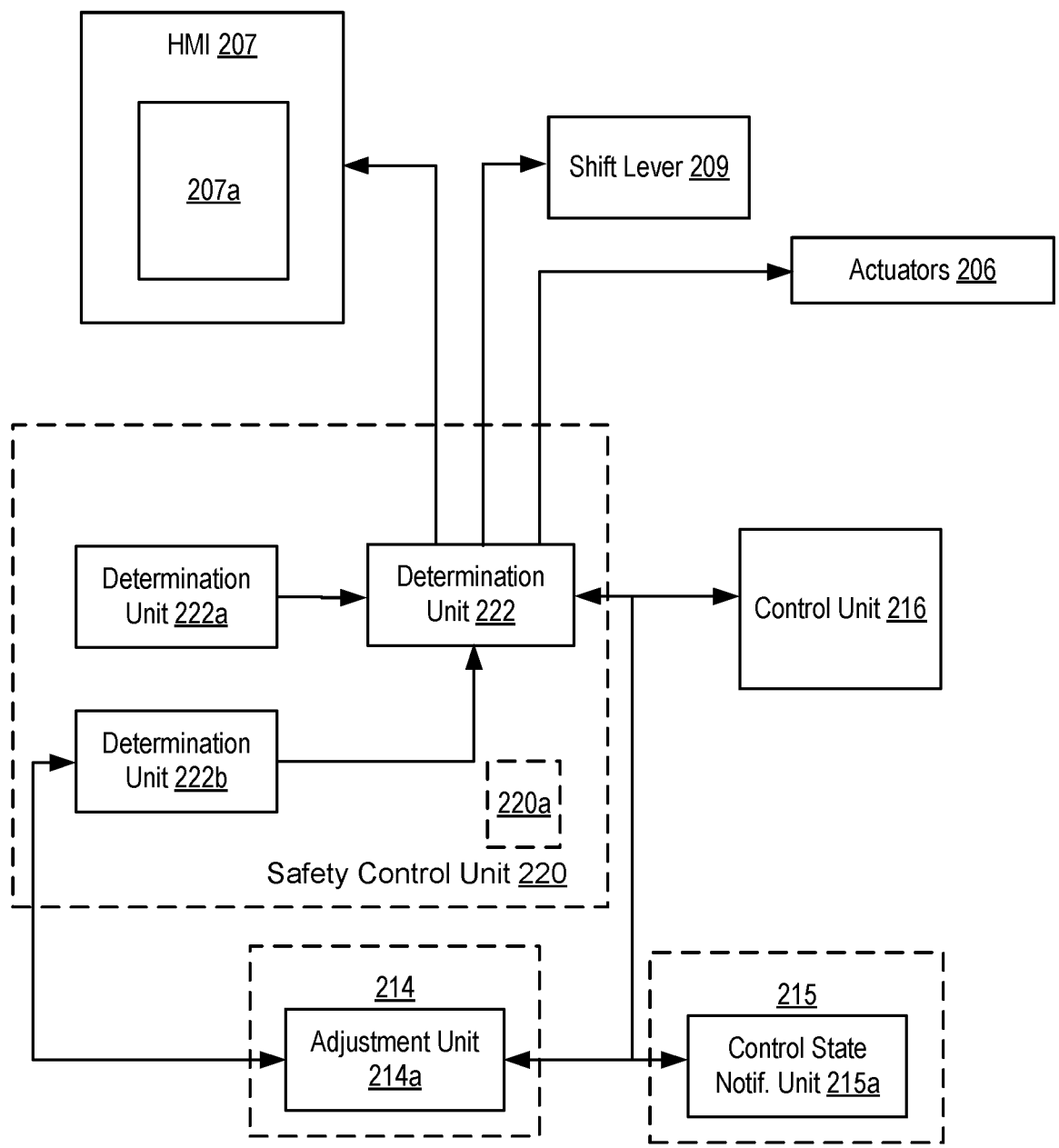
FIG. 2B illustrates an example safety control unit aspect of the autonomous control system of FIG. 2A.

Referring to FIG. 2B, control unit 216 operatively interacts with safety control unit 220 that determines whether or not autonomous control system 200 (in particular, control unit 216) can engage (e.g., activate, start) in autonomous control of HEV 100. For example, safety control unit 220 may include one or more determination units, e.g., determination unit 222a determines whether or not autonomous control can be engaged, based on a difference between a vehicle position calculated from signals received by the GPS reception unit 202 and an actual vehicle position calculated based on an output signal from the external sensor 201, the map information of the map database 204 and so forth. For example, a threshold condition associated with engagement of autonomous control in HEV 100 may be predicated on travel along a certain type of roadway, e.g., known segment(s) of road within map database 204, such as a freeway (versus) country lane. Road curvature may be another condition/characteristic on which autonomous control of HEV 100 may be based. Determination unit 222a may make its determination based on one or more determinative factors.

Control unit 216 may further interact with a determination unit 222b of safety control unit 220 that determines whether or not a trigger to deactivate (stop) an autonomous control mode exists. For example, determination unit 222b can determine whether or not to execute the switch from the autonomous control to manual control based on the level of steering wheel actuation, brake pedal actuation, etc. effectuated by the driver while HEV 100 is being operated in an autonomous control mode, which is obtained by the acquisition unit 211. Other determinative factors or considerations may be the amount of acceleration or deceleration experienced by HEV 100, also determined by acquisition unit 211. When determination unit 222 determines that the autonomous control can be engaged, based on the determinations performed by determination units 222a and/or 222b, control unit 216 engages autonomous control of HEV 100. That is, determination unit 222 may act as a determination aggregator that aggregates determinations rendered by other determination units. Determination unit 222 may be a circuit, e.g., application-specific integrated circuit, logic, software, or some combination thereof that processes the individual determinations rendered by the other determination units (e.g., determination units 222a and 222b) to render an overall determination. That overall determination may control operation of control unit 216, e.g., to disengage autonomous control and switch to manual control or engage in autonomous control.

On the other hand, when determination units 222a and/or 222b determine that a switch from autonomous control to the manual control should be executed, autonomous control is deactivated/disengaged by control unit 216 or control unit 216 is itself deactivated/disengaged, and the driver proceeds to manually control HEV 100. It should be understood that other determination units may be used (or only a single determination unit may be used). In the case of multiple determination units being used, in some embodiments, any single determination that manual control should be executed can serve as a trigger to deactivate autonomous control. In some embodiments, presentation unit 215 is provided with a control state notification unit 215*a* that notifies the driver of a fact that HEV 100 is operating under autonomous control is in execution, and so forth. Such a notification may be displayed on a display of HMI 207, for example. Likewise, If a switch from autonomous control to the manual control is executed, the control state notification unit 215*a* displays, on the display of HMI 207 a corresponding notification.

HMI 207, in some embodiments, may include an autonomous control engagement trigger input unit 207*a* that can be actuated by the driver of HEV 100 to engage in an autonomous control mode (after safety control unit 220 determines that autonomous control can be effectuated).

In some embodiments, the driver of HEV 100 may be able to select an automatic autonomous control engage mode, where autonomous control unit 216 can be automatically engaged when safety control unit 220 determines that the autonomous control can be engaged. In some embodiments, shift lever 209 may be used to set a triggered autonomous control mode and an automatic engage mode (as alluded to above by actuating shift lever 209 to an "A" (AUTOMATIC) position or to a "D" (DRIVE) position.

Figure 3A:
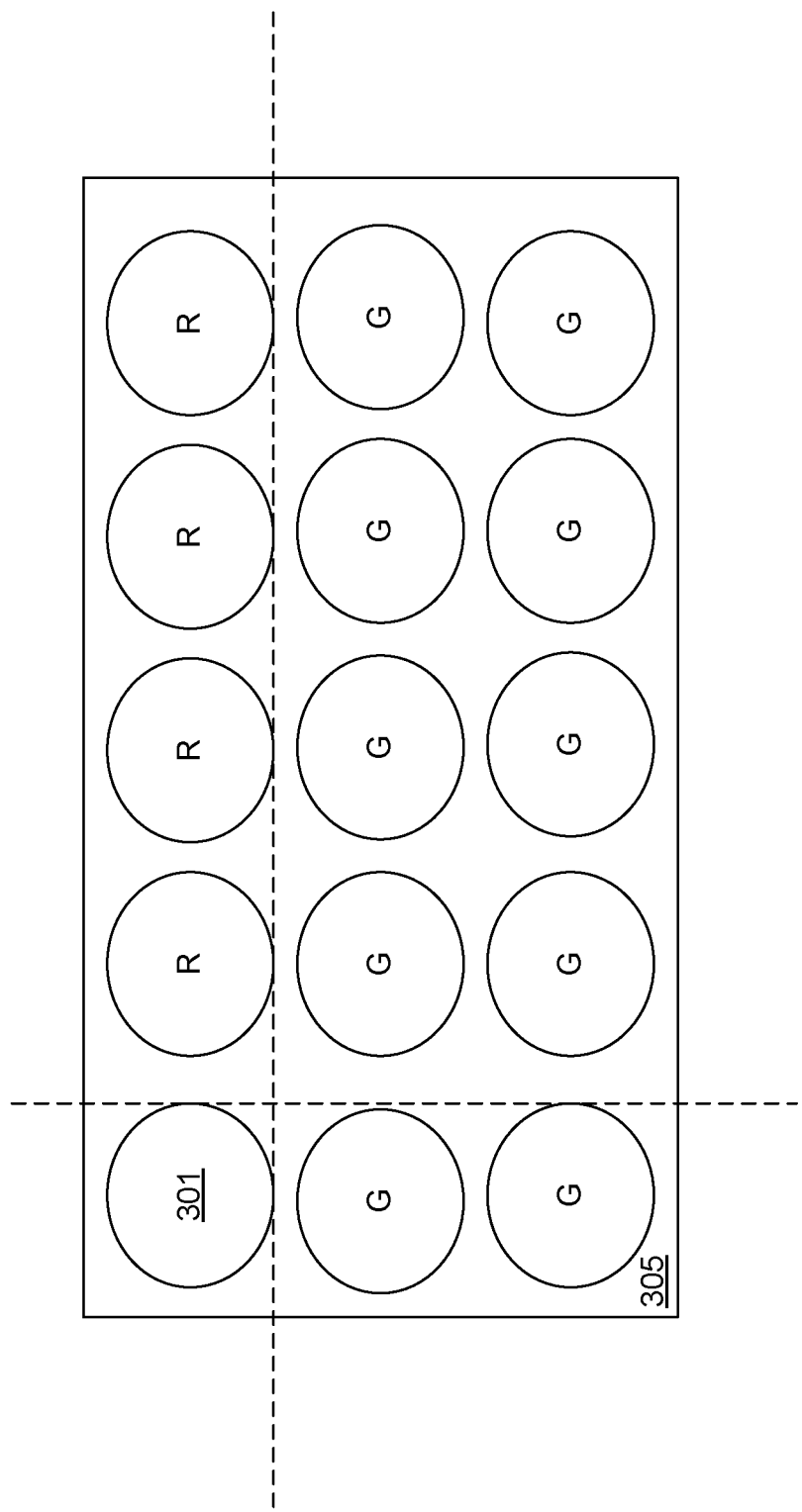
FIG. 3A illustrates an example lighting matrix in accordance with one embodiment.
Figure 3B:
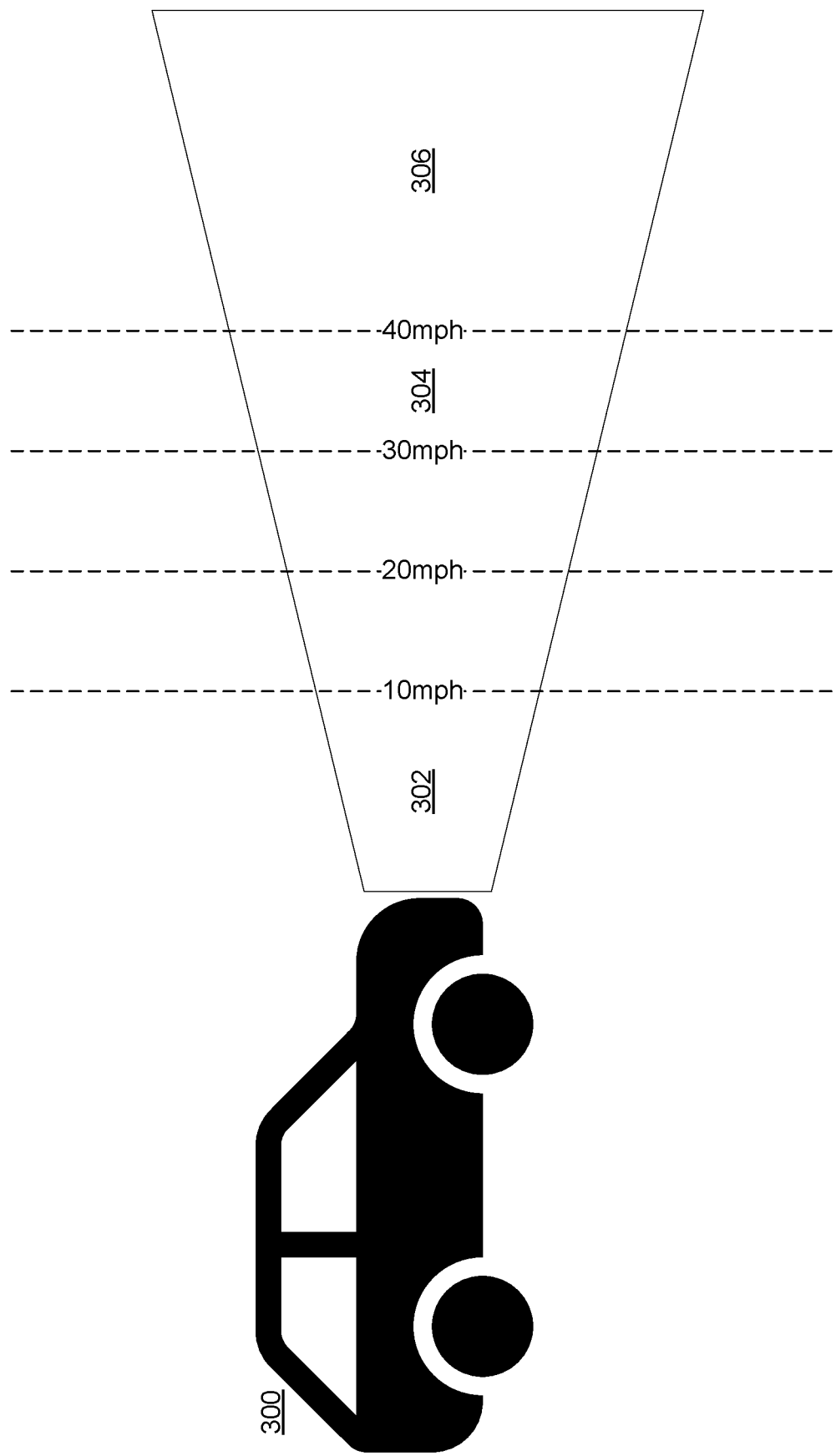
FIG. 3B illustrates an example system for changing headlight properties in accordance with one embodiment.

FIGS. 3A and 3B illustrate example systems for changing headlight properties. A vehicle's headlights may each comprise a plurality of lights to form lighting matrix 305 as illustrated in FIG. 3A. In some embodiments, this lighting matrix 305 comprises an LED lighting matrix. This lighting matrix 305 may comprise a RGB LED lighting matrix that can provide a whole spectrum of colors and various lighting distances. For example, while the vehicle is under the speed limit, lighting 302 may project at a standard white color or other basic color for headlights. The lighting may also be green or another color to signify a safer speed. The lighting matrix enables the vehicle to dynamically adjust the headlight brightness and color depending on the machine readable instructions received from the processing units. This can be accomplished by a grid or array of multiple lights, as illustrated in FIG. 3A. Each bulb 301 may be a different color or brightness, allowing for the headlights to create various patterns. In the example in FIG. 3A, lighting matrix 305 is adjusted such that the lighting from the vehicle to a first distance is colored green, while lighting from the first distance to a second distance is red. In this example, the top row of red lights could have a higher brightness to reach a further distance. Alternatively, the red lights can be adjusted to project at a different angle such that the red light extends a further distance. As the vehicle slows, the lighting matrix may decrease the brightness and/or adjust the projection angle of the bulbs as it is may be unnecessary to project light to a further distance at a slower speed. Ultimately, a driver could gauge the vehicle's speed based on the distance the light reaches.

FIG. 3B illustrates lighting matrix 305 as applied to vehicle 300 to project lighting in front of the vehicle. In one embodiment, external sensor 201 receives sensor data. This sensor data can include environmental data, traffic data, driver data, speeding regulations, and other data that can contribute to the speed of the vehicle. Determination unit 222 can process the sensor data and determine the optimal speed for vehicle 300. As a vehicle increases speed, the lighting distance may need to increase. The system can determine the speed limit based on a particular route, i.e. through navigational systems. An ADAS may supply this data throughout a vehicle's route. This data may be provided from cloud data that can reference traffic events and environmental conditions in real time. Once the vehicle determines the speed limit, the vehicle can then monitor the active speed of the vehicle. This may be accomplished by taking periodic measurements based on a threshold or suggested speed, as discussed further below. This suggested speed may not exceed the speed limit at the particular location of the vehicle. For example, while a vehicle travels on a highway, the suggested speed may not exceed 65 mph, or the speed limit associated with the particular highway. The lighting matrix 305 may be tailored to exceed a threshold associated to a particular speed. For example, if a car is travelling 10 mph, the lighting matrix may project lighting up to a short distance 302 in front of the vehicle. As the speed increases, the distance the light reaches can gradually increase in line with the speed of the vehicle, either through brightness or through the projection angles for each bulb in lighting matrix 305. When the vehicle reaches the maximum speed, i.e. a speed limit, the brightness may no longer increase. This could cause a driver to notice that the lighting is not brightening, signaling that the vehicle is exceeding the speed limit. This can prompt the driver to slow the vehicle until the lighting exceeds a threshold assigned to a particular speed.

In another embodiment, the lighting matrix can implement additional colors. Once the vehicle exceeds the speed limit, the lighting can reach the maximum distance as the normal color. Lighting extending beyond that point 306 can appear as a different color, such as red. This could provide the driver with safe lighting for the speed while also prompting the driver to slow the vehicle. The color may also progress in a gradient. For example, lighting up to a certain speed 302 could start at green, and progress to yellow as the speed approaches the maximum speed 304. The lighting may then progress to red once the vehicle exceeds the speed limit. The driver would then view a gradient of lighting colors to compare the vehicle's speed to suggested speeds. The colors may vary in accordance with a particular state or country's regulations.

In other embodiments, the maximum speed can be based on additional factors besides the speed limit at a particular point. The vehicle may determine a suggested speed based on a variety of environmental factors and provide lighting that exceeds a threshold associated with the suggested speed. These environmental factors can include visibility, weather, speed limit, traffic, road conditions, operator/driver state, or other environmental factors. For example, the suggested speed may decrease further below the speed limit if the vehicle travels during heavy rain. As another example, the suggested speed may decrease to match the flow of traffic in a given area. Operator state may involve the driver's personal characteristics and ability to drive. If the driver appears to be falling asleep, the suggested speed may decrease to increase the driver's safety. In some embodiments, the driver's state can be monitored with one or more internal cameras that can detect a driver's features. If there is no internal camera available, an ADAS may recognize the driver's behavior and make a determination based on a profile of the driver's behavior.

In some embodiments, the suggested speed may only reach a maximum of the speed limit. Certain environmental factors may weigh against that maximum speed to reduce the suggested speed. In one embodiment, the factors can be weighted differently to signify importance. For example, weather conditions and visibility may be weighted more than other factors when determining a suggested speed. In some embodiments, a minimum suggested speed and a maximum suggested speed may be associated with each factor. When determining a suggested speed, the vehicle may select the minimum suggested speed based on the applicable factors. As an example, in a 50 mph zone, the suggested speed based on the presence of fog may be 30 mph, and the suggested speed based on traffic may be 40 mph. The vehicle may selected the lowest suggested speed such that both factors are adequately addressed. Each factor may also have an associated lighting setting. For example, the presence of fog may produce a suggested lighting involving high beams, while traffic may require low beams. The vehicle may select an appropriate brightness based on the weight of the factor. In the present example, if weather conditions are weighted more, then the vehicle may select high beams to accommodate the factor of highest importance. The lighting may change in real time in accordance with dynamic updates to the relevant factors.

Figure 4:
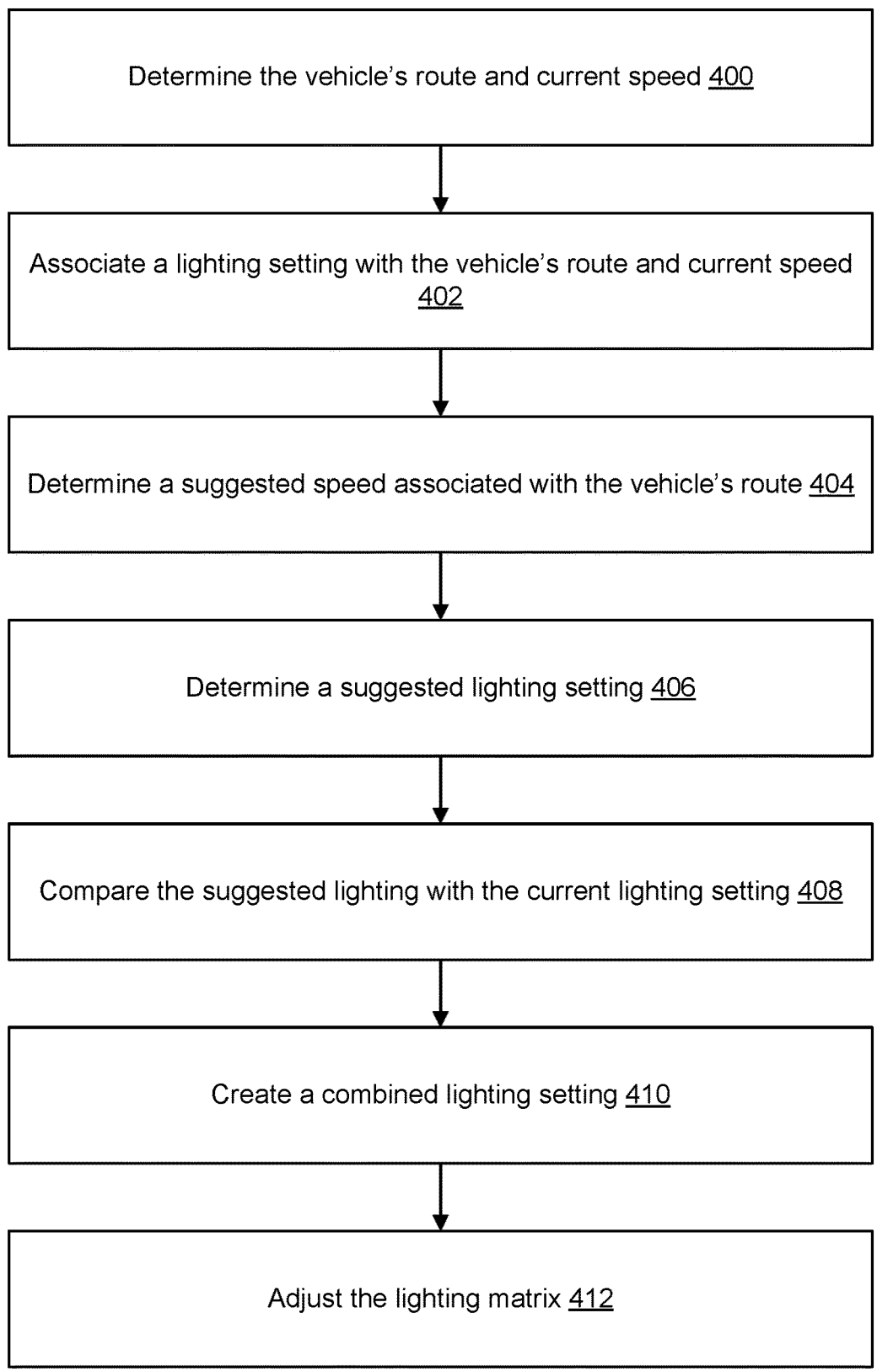
FIG. 4 is a flow chart illustrating operations that may be performed to effectuate influential control in accordance with one embodiment.

FIG. 4 illustrates an example method in accordance with the systems described above. At block 400, the system can determine the vehicle's route and the current speed of the vehicle. The route may be determined according to the navigation system or the ADAS, depending on whether the vehicle has an ADAS. At block 402, the system associates a lighting setting with the vehicle's route and current speed. As described above, lighting settings may be associated with a particular factor such as weather conditions or traffic conditions. The vehicle may select a brightness for the lighting matrix in accordance with these associations. Similarly, as described above, brightness can be associated with a particular speed based on the distance covered by the particular brightness of the light. Furthermore, a particular color may be optimal for the current situation. The ADAS can determine that a white light is more appropriate than a yellow light and associate that with the lighting setting.

At block 404, the system can determine a suggested speed associated with the vehicle's route. As described above, the suggested speed may be determined based on a variety of factors and can associate with a particular configuration of the lighting matrix. At block 406, a suggested lighting setting is created in accordance with the factors described above.

At block 408, the system can compare the suggested lighting with the current lighting setting. This can serve to determine what area is lit with a first color and what area will be lit a second color as described in FIG. 3. By comparing the two lighting settings, the system can determine where the overlap exists and light the distance beyond as a prompt to the driver to slow down, as described above, i.e. through different colored lights or through a different brightness. At block 410, the system can create the combined lighting setting as described above. At block 412, the lighting matrix can be adjusted based on the combined lighting setting such that the vehicle is then able to project multiple colors and brightness of light in accordance with varying speed and environmental conditions. These colors may be displayed in a gradient to gradually show a drive where speed is exceeded, such that the driver does not need to validate speed using the gauges on the vehicle's dashboard.

Figure 5:
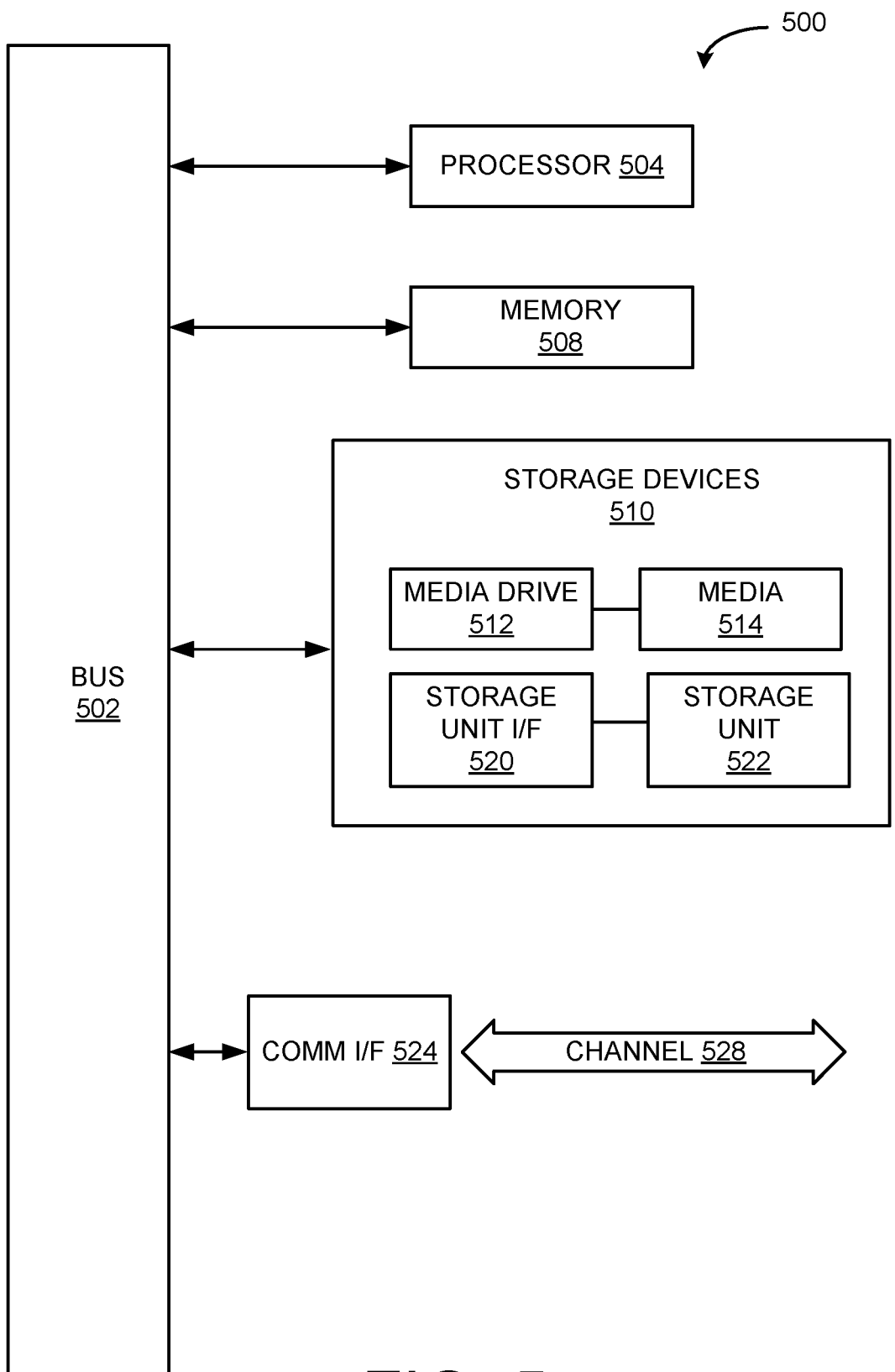
FIG. 5 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 514. For example, a hard disk drive, a solid-state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle comprising:
    a plurality of sensors;
    a lighting matrix;
    a processor; and
    a memory encoded with instructions that when executed, cause the processor to:
        determining the vehicle's route and current speed;
        associating a lighting setting with the vehicle's route and current speed;
        determining a suggested speed associated with the vehicle's route based on one or more environmental factors;
        determining a suggested lighting setting associated with the suggested speed;
        comparing the suggested lighting setting with the lighting setting associated with the vehicle's route and current speed;
        creating a combined lighting setting; and
        adjusting the lighting matrix based on the determined suggested speed to the combined lighting setting.

2. The vehicle of claim 1, wherein the lighting matrix comprises a LED lighting matrix.

3. The vehicle of claim 1, wherein the one or more environmental factors comprise at least one of speed limit, visibility, weather conditions, operator state, and traffic.

4. The vehicle of claim 3, wherein weather conditions are weighted more than the other factors for determining a suggested speed.

5. The vehicle of claim 3, wherein the suggested speed is limited to the speed limit.

6. The vehicle of claim 3, wherein the suggested speed is determined by reducing the speed limit according to a weight associated with each of the one or more environmental factors.

7. The vehicle of claim 3, wherein operator state is determined with the use of an internal camera facing a driver of the vehicle.

8. The vehicle of claim 3, wherein operator state is determined with an advanced driving assistance system (ADAS).

9. The vehicle of claim 3, wherein the environmental factors are determined based on the application of cloud data in real-time.

10. The vehicle of claim 1, wherein the memory is encoded with instructions that when executed, further cause the processor to:
determine the current speed of the vehicle;
determine a lighting setting associated with the current speed; and
adjust the lighting matrix to distinguish lighting associated with the suggested speed from lighting associated with the current speed.

11. The vehicle of claim 10, wherein adjusting the lighting matrix to distinguish lighting associated with the suggested speed from lighting associated with the current speed involves setting lighting associated with the suggested speed as a first color and setting lighting associated with the current speed as a second color.

12. The vehicle of claim 10, wherein adjusting the lighting matrix to distinguish lighting associated with the suggested speed from lighting associated with the current speed involves setting a gradient of lighting colors between the lighting associated with the suggested speed and lighting associated with the current speed.

13. The vehicle of claim 10, wherein the lighting matrix automatically readjusts when the vehicle either increases or decreases speed.

14. The vehicle of claim 10, wherein the lighting matrix automatically readjusts when the vehicle approaches a deviation in the vehicle's route.

15. A method for projecting lighting from a vehicle, comprising:
determining the vehicle's route and current speed;
determining a suggested speed associated with the vehicle's route based on one or more environmental factors by reducing a speed limit associated with the vehicle's route according to a weight associated with each of the one or more environmental factors;
determining a suggested lighting setting associated with the suggested speed; and
adjusting a lighting matrix of the vehicle based on the suggested speed to the suggested lighting setting.

16. The method of claim 15, wherein the one or more environmental factors comprise at least one of speed limit, visibility, weather conditions, operator state, and traffic.

17. The method of claim 15, further comprising creating a combined lighting setting by setting lighting associated with the suggested speed as a first color and setting lighting associated with the current speed as a second color.

18. The method of claim 15, further comprising creating a combined lighting setting by setting a gradient of lighting colors between the lighting associated with the suggested speed and lighting associated with the current speed.

19. The method of claim 15, wherein the lighting matrix automatically readjusts when the vehicle either increases or decreases speed.

20. The method of claim 15, further comprising readjusting the lighting matrix when the vehicle approaches a deviation in the vehicle's route.

21. A method for projecting lighting from a vehicle, comprising:
determining the vehicle's route and current speed;
determining a suggested speed associated with the vehicle's route based on one or more environmental factors;
determining a suggested lighting setting associated with the suggested speed;
creating a combined lighting setting by setting lighting associated with the suggested speed as a first color and setting lighting of the vehicle associated with the current speed as a second color; and
adjusting a lighting matrix of the vehicle based on the combined lighting setting.

22. The method of claim 21, wherein the one or more environmental factors comprise at least one of speed limit, visibility, weather conditions, operator state, and traffic.

23. The method of claim 21, wherein determining a suggested speed comprises reducing a speed limit associated with the vehicle's route according to a weight associated with each of the one or more environmental factors.

24. The method of claim 21, wherein creating the combined lighting setting comprises setting a gradient of lighting colors between the lighting associated with the suggested speed and lighting associated with the current speed.

25. The method of claim 21, wherein the lighting matrix automatically readjusts when the vehicle either increases or decreases speed.

26. The method of claim 21, further comprising readjusting the lighting matrix when the vehicle approaches a deviation in the vehicle's route.

27. A method for projecting lighting from a vehicle, comprising:
determining the vehicle's route and current speed;
determining a suggested speed associated with the vehicle's route based on one or more environmental factors;
determining a suggested lighting setting associated with the suggested speed;
creating a combined lighting setting by setting a gradient of lighting colors between the lighting associated with the suggested speed and lighting associated with the current speed; and
adjusting a lighting matrix of the vehicle based on the combined lighting setting.

28. The method of claim 26, wherein the one or more environmental factors comprise at least one of speed limit, visibility, weather conditions, operator state, and traffic.

29. The method of claim 26, wherein determining a suggested speed comprises reducing a speed limit associated with the vehicle's route according to a weight associated with each of the one or more environmental factors.

30. The method of claim 26, wherein the lighting matrix automatically readjusts when the vehicle either increases or decreases speed.

31. The method of claim 26, further comprising readjusting the lighting matrix when the vehicle approaches a deviation in the vehicle's route.

* * * * *

UNITED STATES PATENT AND TRADEMARK OFFICE
CERTIFICATE OF CORRECTION

Page 1 of 1

PATENT NO. : 11,964,610 B2
APPLICATION NO. : 17/723988
DATED : April 23, 2024
INVENTOR(S) : Guillermo Pita Gil et al.

It is certified that error appears in the above-identified patent and that said Letters Patent is hereby corrected as shown below:

On the Title Page

In the item "(73) Assignee:", please replace:
"(73) Assignee: TOYOTA RESEARCH INSTITUTE, INC., Los Altos, CA (US)"
With:
--(73) Assignees: TOYOTA RESEARCH INSTITUTE, INC., Los Altos, CA (US); TOYOTA JIDOSHA KABUSHIKI KAISHA, Toyota-shi (JP)--

Signed and Sealed this
Twenty-first Day of May, 2024

Katherine Kelly Vidal
*Director of the United States Patent and Trademark Office*